United States Patent [19]
Piesner

[11] 4,211,034
[45] Jul. 8, 1980

[54] HYDROPONIC GROWING SYSTEMS
[76] Inventor: Barry J. Piesner, 1146 E. 23rd St., Brooklyn, N.Y. 11210
[21] Appl. No.: 880,692
[22] Filed: Feb. 23, 1978
[51] Int. Cl.$^2$ ............................................. A01G 31/02
[52] U.S. Cl. ........................................... 47/62; 47/59
[58] Field of Search ....................................... 47/59–64
[56] References Cited

U.S. PATENT DOCUMENTS

| | | | |
|---|---|---|---|
| 2,241,699 | 5/1941 | Cooper | 47/62 |
| 2,983,076 | 5/1961 | Merrill | 47/62 |
| 3,103,763 | 9/1963 | Malchair | 47/62 |
| 3,451,162 | 6/1969 | Rasmussen | 47/62 |
| 4,035,950 | 7/1977 | Anselm | 47/59 |

FOREIGN PATENT DOCUMENTS

| | | | |
|---|---|---|---|
| 147862 | 11/1962 | U.S.S.R. | 47/62 |
| 483091 | 12/1975 | U.S.S.R. | 47/62 |
| 496999 | 3/1976 | U.S.S.R. | 47/62 |

OTHER PUBLICATIONS

"Automatic Sub-Irrigation Sand Culture Technique for Comparative Studies in Plant Nutrition", 47/62, Lab. Pract. (GB), vol. 23, No. 1, Jan. 74.

*Primary Examiner*—Paul T. Sewell
*Assistant Examiner*—Steven A. Bratlie
*Attorney, Agent, or Firm*—Ostrolenk, Faber, Gerb & Soffen

[57] ABSTRACT

A hydroponic growing system consists of an elongated growing unit disposed above a supply tank which normally contains a nutrient solution. The growing unit contains pearlite or another solid particle growing medium into which the plant roots extend. Periodically nutrient solution is pumped into the growing unit and then air is pumped through the nutrient solution and growing medium in the growing unit to aerate the plant roots which extend into the growing medium. Thereafter, much of the nutrient solution is permitted to drain from the growing unit to the supply tank with some of the solution adhering to the growing medium to nourish the plant roots.

10 Claims, 5 Drawing Figures

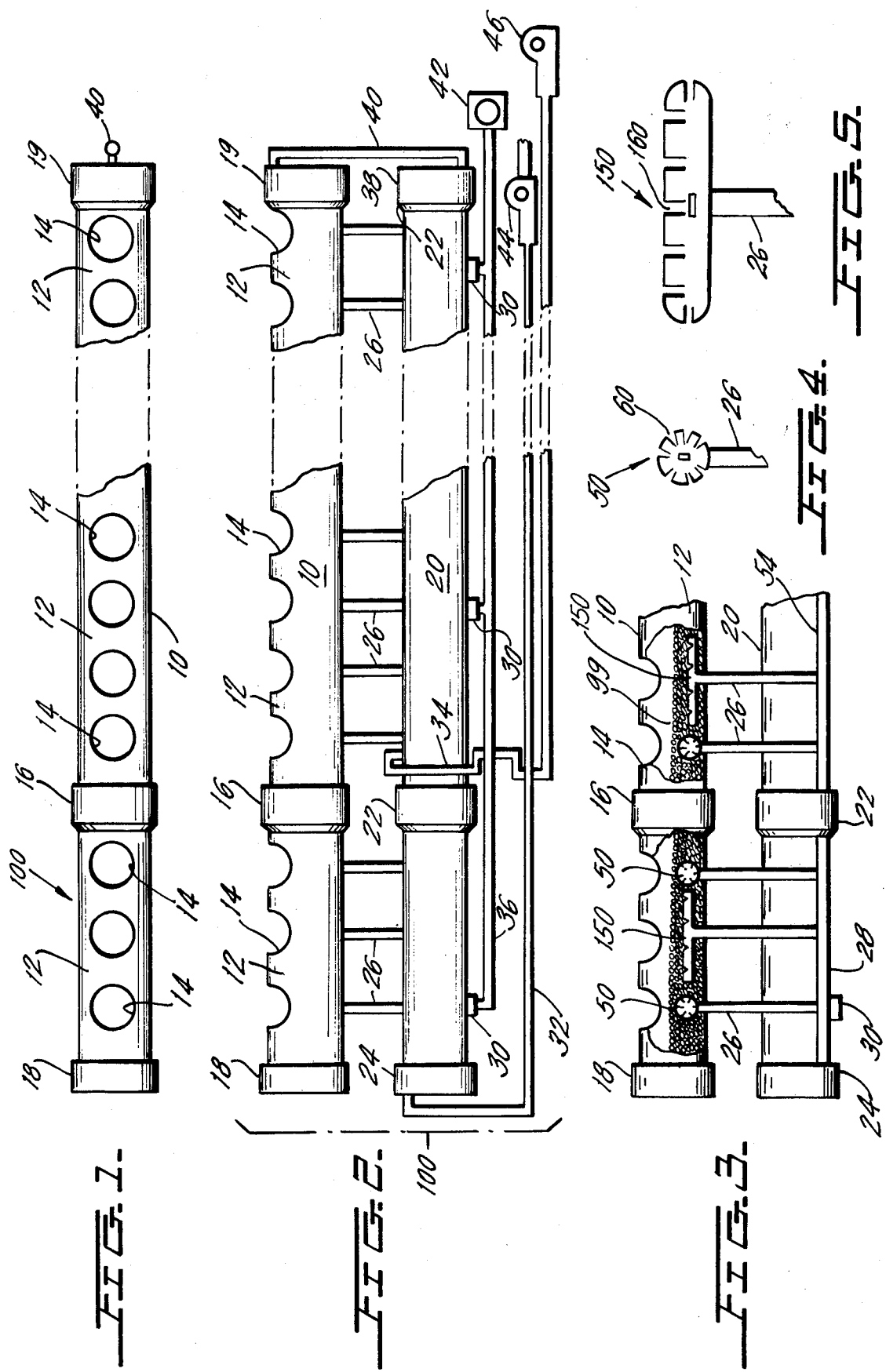

HYDROPONIC GROWING SYSTEMS

The present invention relates generally to growing systems and more particularly to a means for growing plants hydroponically in solid particle growing medium, rather than soil, which is fed periodically with a synthesized nutrient solution.

It is an object of the present invention to provide a growing medium for plants without soil, such growing medium being, for example, pearlite or gravel in conjunction with a synthesized nutrient solution.

It is a further object of the invention to provide a balanced nutrient solution contained within a specifically designed growing device whereby the nutrient solution is pumped directly to the plant roots during specified timed daily feedings.

Utilizing the instant invention, plants will flourish when grown hydroponically in a manner superior to the manner in which they would grow in the normal soil medium due to the fact that the plant roots do not have to develop the expansive root systems which they normally do in soil to absorb the necessary plant food. Further, due to the fact that the root systems are not compelled to grow or plow through a dense soil medium in order to find food and water as they would in a normal soil medium. In utilizing the hydroponic growing technique the plants begin vertical growth very quickly and grow on an average of thirty (30%) percent faster than they would in a soil medium and ripen earlier.

Further, in using the hydroponic growing medium and system the plants require considerably less space in which to grow due to the fact that their feedings and root structures are not contained, thereby permitting the plants to feed and breathe much more easily than they could in soil.

In addition, forced aeration circulates freely throughout the root structure within the nutrient solution and the growing medium.

Accordingly, a primary object of the instant invention is to provide a novel improved hydroponic growing device and medium within which plants may be grown in a synthetic absent the use of soil.

Another object is to provide a novel hydroponic growing means which may be assembled on the location and will be of such size as to produce a commercially feasible growing area for the production of fruits, vegetables or flowing plants.

Still another object is to provide an improved mechanical hydroponic growing device utilizing a system of pumps and interlocking tubular mechanisms whereby the hydroponic growing system may be expanded at will to whatever length may be desired by the user.

A further object is to provide a novel hydroponic growing system having a plurality of interchangeable parts which will be readily available and which will be in a manner simple enough for the ultimate user to be able to assemble and operate with a minimum of instruction.

A still further object is to provide a novel hydroponic growing system whereby plants may be grown in a confined space wherein the space utilization will produce a greater yield per square foot utilized than could be atained under normal planting techniques.

Yet another object is to provide a low-cost growing medium which is utilizable notwithstanding local weather and climatic conditions.

These objects together with the other objects, features and advantages of the present invention, will become more obvious when considered in connection with the accompanying specification, wherein:

FIG. 1 is a plan view of a hydroponic growing unit constructed in accordance with teachings of the instant invention;

FIG. 2 is a side elevation of the hydroponic growing unit of FIG. 1 showing the interconnection between the upper and lower units together with the pump and tubing means utilized therewith;

FIG. 3 is a fragmentary side elevation, partially cut away to show the interior of the hydroponic growing unit together with the aeration and feeding tubes utilized herewith;

FIG. 4 is an enlarged view of the aeration-filter unit shown in FIG. 3; and

FIG. 5 an enlarged view of an alternate embodiment of the aeration-filter unit utilized in the hydroponic growing device of the present invention.

It is to be noted that in the following description for the hydroponic growing unit of the present invention corresponding reference numerals are utilized to designate corresponding similar parts in each of the Figures of the drawings. Referring now in particular to FIGS. 1 through 3 wherein the hydroponic growing system of the present invention is designated by reference numeral 100. System 100 includes elongated growing unit 10 constructed of a plurality of non-porous plastic pipe-like units 12 each having a plurality of apertures 14 formed at the top thereof to permit plants to extend outside of growing unit 10.

The left end of each length of pipe 12 as viewed in FIGS. 1–3, is tapered and fits into collar 16 of the adjacent pipe length 12 to provide for interlocking expansion of the hydroponic growing unit 10. Fluid tight flanged cover 18 is provided to close one end of hydroponic growing unit 10 and the other end thereof is closed by fluid tight flanged cover 19. The latter is provided with an aperture having a fitting for the upper end of glass as viewing tube or level gauge 40, the purposes of which will become clear as this specification continues.

Directly below growing unit 10 there is disposed an elongated supply tank generally designated by reference numeral 20. Tank 20 is constructed of a plurality of plastic pipe sections connected end-to-end at coupling collars 22, and having fluid tight end covers 24 and 38. Cover 38 is provided with an aperture having a fitting for the lower end of viewing tube 40. Between the growing unit 10 and supply tank 20 there are provided a plurality of supply and drain tubes, designated by reference numerals 26. In addition, supply tank 20 is provided with a plurality of filters, designated by reference numeral 30. Fluid replenishment line 32 connected to end cap 24 is adapted to deliver fluid from pump 44 into the supply tank 20. Line 32 is positioned at the upper portion of the supply tank 20 so that the fluid supplied to the tank 20 will always be supplied at the highest portion thereof to prevent contamination of new fluid. Air pressure line 34 is connected to supply tank 20 at the uppermost portion thereof and pressurized air is supplied to line 34 by blower type pump 46.

Filters 30 are placed at the lowermost portion of supply tank 20 and are interconnected by fluid line 36 connected to a filtering tank 42 whereby any contaminants in the fluid are screened and filtered and thereafter transferred to the filtering tank 42. Fluid is pumped from the latter back into the nutrient supply tank (not shown) for eventual replenishment into the supply system through the pump 44 and the supply line 32.

Referring now specifically to FIG. 3, it will be noted that the supply and drain tubes 26 connected to screen 54 are positioned close to and above the bottom 28 of tank 20. Screen 54 prevents contamination of the nutrient fluid due to gravitational dropout of contaminants through screen 54 with clean fluid maintained above screen 54 for continuing use. Fluid supply and drain tubes 26 are provided at their uppermost ends with discharge filters 50, shown in particular in FIG. 4. Each filter 50 is provided with a plurality of apertures 60 through which the nutrient fluid and then air is supplied through supply and drain tubes 26 to the growing area in hydroponic growing unit 10.

FIG. 5 illustrates an alternate embodiment of a filtering mechanism 150 for use at the top of each supply and drain tube 26. In particular, filter 150 is an elongated eliptical filter containing a plurality of supply holes or apertures 160 formed by narrow slits.

Operation of hydroponic growing system 100 is as follows. Seedlings, seeds or small plants, as the case may be, are placed into the growing medium consisting of a bed of gravel, volcanic ash and/or pearlite 99 (FIG. 3), in growing unit 10, and are planted therein by the user of system 100. Feeding of these is by a nutrient solution which is pumped into system 100 by fluid pump 44 until such time as supply tank 20 is filled to its capacity. Once the fluid in supply tank 20 is filled to its capacity pressured air provided by pump 46 is delivered by supply tube 34 to the uppermost portion of the supply tank 20. This pressurized air from pump 46 drives the fluid nutrient in supply tank 20 upward through supply and drain tubes into hydroponic growing tank 10. The amount of fluid in the system is clearly visible through glass viewing tube 40 so that the operator will know when the fluid has been wholly pumped up from supply tank 20 to growing unit 10. It is to be understood that in lieu of visual or manual operation, electrical solenoid controls can be used.

After the fluid has been pumped into the growing unit 10, pump 46 continues to supply pressurized air which now flows through tubes 26 into unit 10, bubbling through the nutrient fluid and growing medium 99 to aerate the plant roots. This method of aeration produces better control than aeration provided by aerating the nutrient solution before or while it is being pumped into growing unit 10. After a predetermined time interval, pump or blower 46 is shut off and the force of gravity causes a draining back of the fluid through the gravel, volcanic ash and pearlite bed 99 where the seeds have been planted back through tubes 26 into the supply tank 20. In supply tank 20 any sediment which may have been picked up by the fluid from the gravel, volcanic ash and pearlite mixture 99 settles below screen 54 and is carried from tank 20 through filters 30 and return line 36, back to the fluid filter tank 42. Once the fluid has been refiltered in the filtering tank 42, the fluid is then ready for reinsertion into supply tank 20.

In the above manner it is possible to retain a controlled growing system for plants wherein the root structures will be much smaller than those necessary in a normal plant due to the fact that the growing mixture or solution is supplied directly to the plant roots and the roots are not compelled to spread out to seek the food as they must normally do. Accordingly, in this manner of growing greater yield can be obtained within a limited amount of space and this procedure, due to its limited space, lends itself to utilization, particularly in arid or dry areas, since the fluid is less likely to evaporate from the growing tank or the supply tank and, in addition thereto, the growing medium and nutrient solution can be controlled to satisfy particular requirements of various plants to be grown.

While growing and supply units 10, 20 have each been described as being constructed of a plurality of connected pipe sections, it is noted that a single long pipe section may be utilized. In addition it is noted that the plurality of round apertures 14 at the top of unit 10 may be replaced by one or more elongated apertures.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A hydroponic growing system including, in combination, an elongated growing container constructed to hold a porous solid growing medium wherein plant roots are to be disposed, said growing container provided with relatively extensive aperture means located at the upper surface of said growing container and through which plant foliage is to extend outside of said growing container, a separate supply tank constructed to hold a fluid growing solution, supply and drain tube means extending from said supply tank near the bottom thereof and outwardly from said supply tank into said growing container, and supply means connected to said supply tank, said supply means when activated furnishing pressurized air to said supply tank to initially force a fluid growing solution from said supply tank upwardly through said tube means into said growing container and immediately thereafter supplying air which bubbles through a growing medium and growing solution in said growing container for a predetermined interval of time, said supply means when deactivated permitting growing solution in said growing container to flow through said tube means back to said supply tank, and means connected at the upper end of the supply and drain tube means for distributing air delivered through said tube means along the length of said growing container.

2. A hydroponic growing system as set forth in claim 1 in which gravity is the sole means forcing growing solution to flow through said tube means back to said supply tank.

3. A hydroponic growing system as set forth in claim 1 in which the growing container is constructed of a plurality of pipe-like sections connected end-to-end.

4. A hydroponic growing system as set forth in claim 1 in which the supply tank is of the same general size as the growing container and is positioned therebelow.

5. A hydroponic growing system as set forth in claim 4 in which both the growing container and the supply tank are constructed of a plurality of pipe-like sections connected end-to-end.

6. A hydroponic growing system as set forth in claim 1 in which the supply and drain tube means extends above the lowermost portion of the growing container.

7. A hydroponic growing system as set forth in claim 1 in which the supply and drain tube means are distributed along the length of the growing unit.

8. A hydroponic growing system as set forth in claim 1 also including a fluid level indicator connected to the interior of said supply tank and readable from outside thereof.

9. A hydroponic growing system as set forth in claim 8 in which the level indicator extends considerably above the bottom of the growing container.

10. A hydroponic growing system as set forth in claim 1 also including filter means disposed near but above the bottom of the supply tank, said supply and drain tube means having its lower end extending no lower than said filter means.

* * * * *